H. L. HERVEY.
Churn.
No. 49,345.
Patented Aug. 8, 1865.
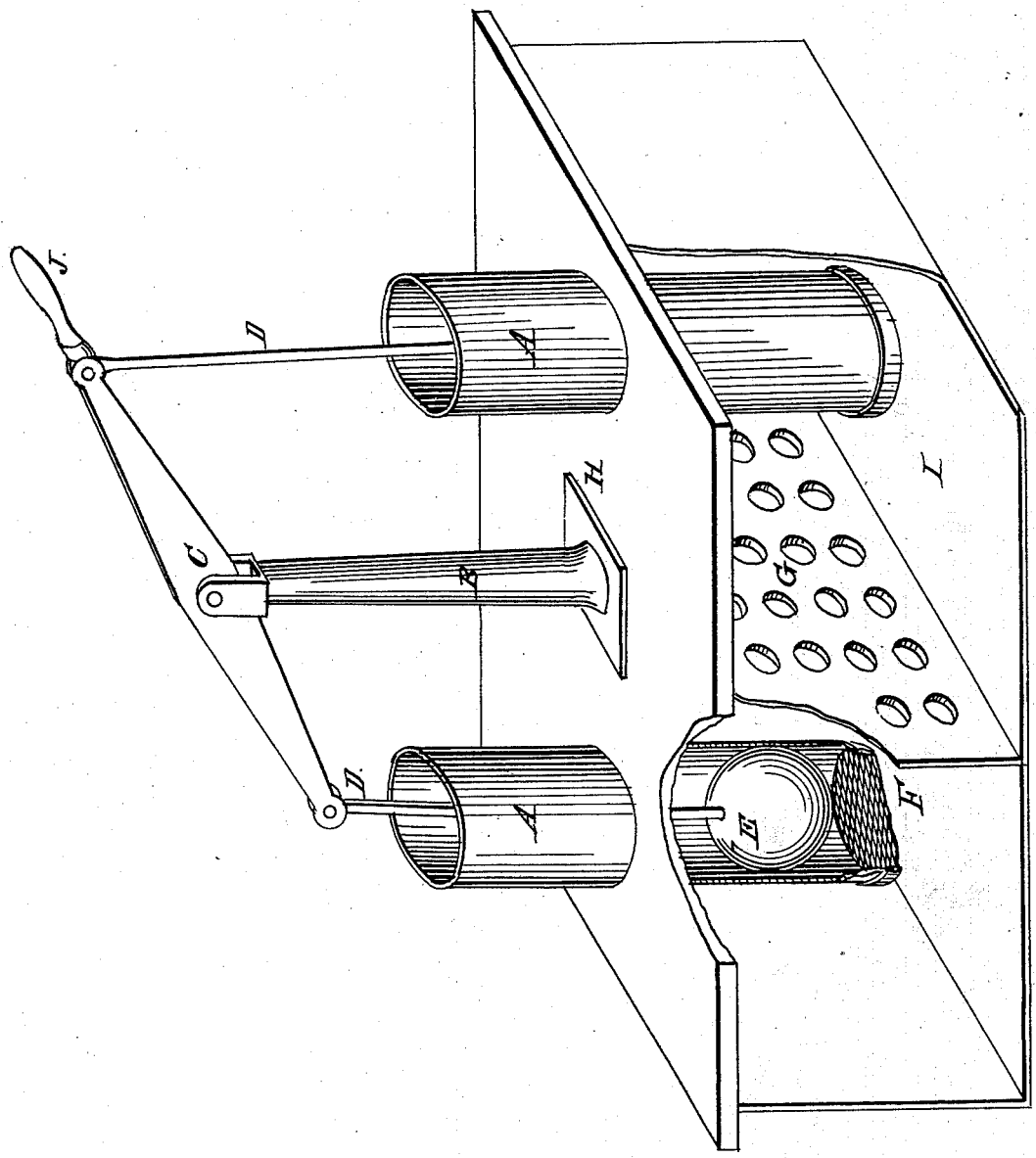
WITNESSES.
INVENTOR

UNITED STATES PATENT OFFICE.

HORACE L. HERVEY, OF PHILADELPHIA, PENNSYLVANIA, ASSIGNOR TO HIMSELF AND JOHN HART, OF SAME PLACE.

IMPROVEMENT IN CHURNS.

Specification forming part of Letters Patent No. 49,345, dated August 8, 1865.

*To all whom it may concern:*

Be it known that I, HORACE L. HERVEY, of Philadelphia, in the county of Philadelphia, in the State of Pennsylvania, have invented a certain new and useful Improvement in Churns; and I do hereby declare that the following is a full and exact description thereof, reference being had to the accompanying drawing, and to the letters of reference marked thereon.

To enable those skilled in the art to make and use my invention, I will describe its construction and operation.

The nature of my invention principally consists in pumping the milk or cream through a gauze or perforated sheet, as will more fully hereinafter appear.

The drawing shows a side and one end of the churn removed for the purpose of exhibiting its structure.

In the construction of my churn I first make the box I, of any shape that may be preferred, and then make the cover H to fit upon it, being held down by hooks. I then construct the two cylinders A A of tin or other material, and place over their lower ends a cap or disk of gauze wire, *a*, or perforated sheet or plate F F. The cylinders A A are made fast to the cover of the churn, so that their lower ends do not quite touch the bottom of the churn. The gauze may be attached to a movable cap fitting on lower ends of cylinders A.

B is a center post extending upward from the cover, and serves as bearing for the walking-beam C, which is provided with a handle, *j*.

D D are piston-rods jointed to the ends of the walking-beam, and having piston-heads, made of rubber balls E E or otherwise, which work up and down in the cylinders A A.

G is a perforated partition placed across the inside of the box I. This perforated partition (there may be several of them) serves to gather the particles of butter.

The operation is as follows: First place the milk or cream in the box I. Then put on the cover H and fasten it down. Then by means of the handle *j* work the pistons E E up and down, "pump fashion," in their cylinders A A. The pistons act as pumps and force the milk or cream back and forth through the wire netting or gauze, thereby breaking the globules which contain the butter very rapidly. Also, when one piston is drawing the cream up through the gauze of one cylinder the other piston is forcing a portion of the cream down through the gauze of the other cylinder and at the same time forces it to pass through the perforated or slotted partitions, which serve to gather the particles of butter.

Having thus fully described my invention, what I claim as new, and desire to secure by Letters Patent, is—

The combination and arrangement of the two cylinders A and pistons D E with the perforated plates F at the bottom of the cylinders, for the purpose of simultaneously forcing the cream up through one plate F by exhaustion and down through the other plate F by pressure, substantially as described.

In testimony that I claim the above I have hereunto set my hand this 8th day of June, 1865.

H. L. HERVEY.

In presence of—
GEORGE R. SCOTT,
E. S. FITCH.